United States Patent Office 2,698,281
Patented Dec. 28, 1954

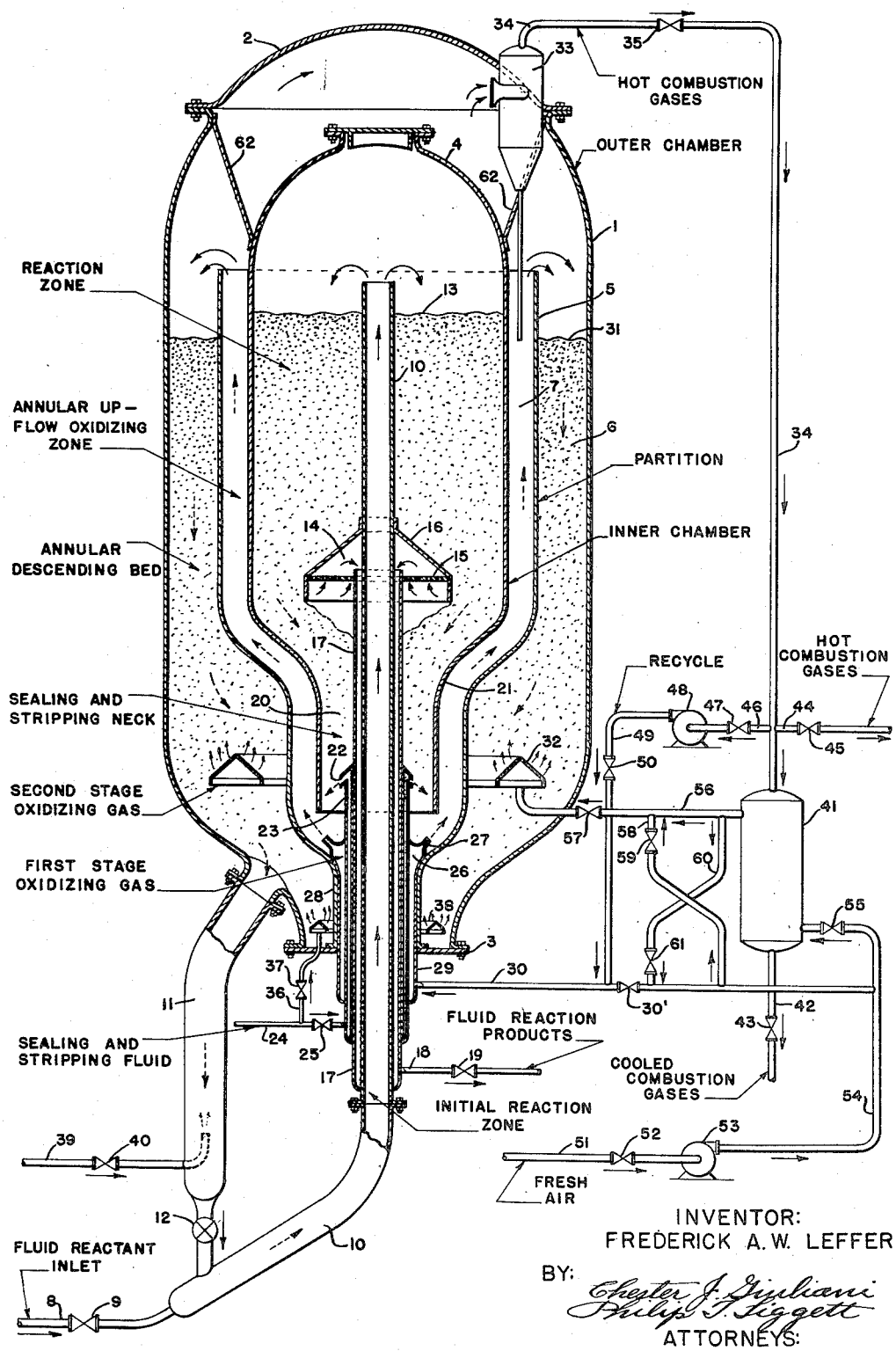

2,698,281

METHOD AND APPARATUS FOR THE CONTINUOUS CONTACTING OF SUBDIVIDED SOLID PARTICLES SUCCESSIVELY WITH AT LEAST THREE FLUID REACTANT STREAMS

Frederick A. W. Leffer, Riverside, Ill., assignor to Universal Oil Products Company, Chicago, Ill., a corporation of Delaware Application March 14, 1951, Serial No. 215,514

9 Claims. (Cl. 196—52)

The present invention relates to an improved method and means for effecting the contacting of particulated solid material in a continuous processing operation wherein the particles pass through a series of contacting zones maintained within a compact unit, and more specifically, means providing for contacting the particles with at least three principal reactant streams.

The process and apparatus of this invention may utilize subdivided solid particles which are of a material other than catalyst and may effect the conversion other than fluid hydrocarbonaceous reactant streams, however, the present flow is particularly adapted to effecting the catalytic cracking of hydrocarbon vapors, or other related catalytic processes for the conversion of hydrocarbonaceous reactant fluids, and the regeneration of the catalyst particles so that they may be utilized in a continuous cyclic operation.

It is an object of the present invention to provide an improved process and a compact unitary form of apparatus for effecting a continuous cyclic flow of particulated solid material through separate contacting zones with contact of the solid material with at least three different reactant streams within the separate portions of the cyclic flow path at a remarkably high thermal efficiency, and with the elimination of the need for long external standpipes and conduits for hot solids transfer with more than a single valve or other mechanical flow control means therein.

Another object of the present invention resides in the provision for handling subdivided catalyst particles in such manner that they may be contacted with fluid reactant in countercurrent flow in a confined reaction zone and subsequently contacted separately within primary and secondary regeneration zones at controlled temperature and reactivation conditions assuring an optimum regeneration procedure.

It is a further feature and object of the present invention to provide for a first stage reactivation or regeneration of subdivided solid particles within an annular fluidized column of the latter which screens an inner reaction zone from an external annular final regeneration zone, with accompanying blending and heat exchange means providing for the controlled oxygen content of the regenerating stream and its temperature control.

In a broad aspect, the present invention provides for contacting subdivided solid particles with at least three reactant streams, in a manner which comprises, commingling a fluid reactant stream with subdivided solid particles at conversion conditions and passing the mixture upwardly in a confined path to the upper portion of a confined inner reaction zone, reversing the direction of flow of the resulting fluid stream and subdivided particles and passing them concurrently downwardly in a relatively compact descending bed to the lower portion of the inner reaction zone, separating the resulting fluid product stream from the lower portion of the descending bed of particles and discharging this product stream from the reaction zone, such discharge being effected in a more specific and highly advantageous mode of operation through an annular path extending downwardly around and in heat exchange relationship with an initial portion of the aforesaid confined path, withdrawing contacted subdivided particles in a descending column from the lower portion of the inner reaction zone, reversing the flow of the withdrawn contacted particles and fluidizing them in a second fluid reactant stream, reacting the latter while concurrently passing the same together with the fluidized contacted particles upwardly as a fluidized annular column ascending in between the inner reaction zone and an external descending column of particles to an elevated portion of an outer reaction zone, gravitating the solid particles from the top portion of the fluidized annular column onto the top portion of the external annular column, introducing a third fluid reactant stream into the lower portion of the external annular column and effecting the countercurrent contacting of the particles descending therethrough, disengaging resulting fluid product streams upwardly from the top portions of both the ascending and descending annular columns of particles and discharging them in commingled state from the upper portion of the outer reaction zone, withdrawing particles downwardly from the lower portion of the external annular column and the outer reaction zone and commingling them with the first-mentioned reactant stream as set forth, in a manner maintaining a continuous cyclic flow of solid particles through the conversion system.

The solid particles of the fluidized annular column overflow or gravitate onto the top portion of the external annular descending column of particles, so that the adjacent annular zones confining these annular columns and being in open communication with each other at their upper ends are particularly adapted to accommodate related conversion steps or operations. For example, the present arrangement and means for handling subdivided particles is particularly useful in effecting the continuous conversion of fluid hydrocarbon or hydrocarbonaceous reactant streams in countercurrent contact with finely divided catalyst, with two stages of regeneration or reactivation being effected by different controlled oxygen-content streams. In a preferred two-stage regeneration operation, the contacted catalyst particles, contaminated by carbonaceous deposits and being withdrawn from the lower end of the inner reaction zone, are commingled with a primary regenerating gas which has a low oxygen content, such as a gas of lower free oxygen content than that of air obtained by mixing air or oxygen with flue gas or other substantially inert gaseous medium, so that only a portion of the carbonaceous deposit is burned from the catalyst particles as they pass upwardly in the ascending fluidized annular column which is adjacent to and in indirect heat exchange relationship with the outer portion of the inner reaction zone. The oxidation or combustion of carbonaceous deposits from the particles in the rising annular column is controlled to maintain a temperature which is about the same or only moderately higher than the temperature within the inner reaction zone. The partially regenerated particles passing to the external descending annular column are contacted with a regenerating gas stream having a higher oxygen concentration, such as for example air alone, so that substantially all of the carbonaceous deposit is burned from the particles prior to their being returned to the reaction zone.

Also, the gaseous reactant streams being introduced into each of the regeneration stages may be preheated in a manner providing a controlled temperature as well as a controlled oxygen content. In accordance with the preferred embodiment of the present invention, means is provided for passing a stream of the hot flue gases, commingled upon their disengagement from the upper portions of the adjacent annular regeneration zones, in indirect heat exchange relationship with the air or oxygen-containing stream which is introduced into direct contact with the contaminated and carbonized particles. Interconnecting conduit means is also provided in conjunction with the heat exchange means whereby hot flue gases may be blended with the air streams to provide the aforementioned controlled oxygen content of the regenerating gas streams, particularly for use in the first stage of regeneration where incomplete oxidation is desired. A temperature control within the second stage of regeneration is desirable in order that the temperature of the particles being withdrawn therefrom and recycled to the reaction zone provide a suitable conversion temperature for effecting the conversion of the reactant stream being introduced through the confined inlet path to the inner reaction zone.

The method of operation provided by the process flow and the unitary apparatus of this invention will have its greatest use in connection with concurrent endothermic reaction performed both within the preferably vertical straight-line inlet or transfer path leading to the upper portion of the inner reaction zone and within the relatively compact descending particle bed of the reaction zone itself, with a balancing of the temperature within the inner reaction zone with the exothermic reaction temperature in the ascending fluidized annular column, and without the necessity of balancing the temperature within the inner reaction zone with the temperature at which the exothermic reaction is completed in the outer descending annular column of particles. This type of operation is thus applicable with particular advantage in effecting the catalytic endothermic conversion of hydrocarbons including cracking, reforming, and dehydrogenation reactions, and especially in those cases of catalytic hydrocarbon conversion wherein substantial combustible deposits are formed during the endothermic reaction. However, the method and apparatus in the present invention need not be limited to catalytic operations, for noncatalytic conversions may well be utilized, where there is accompanying deposition of carbonaceous material on the circulating solid material. Such other operations may include ammonia synthesis gas production from methane or natural gas admixed with air or steam, and hydrogen cyanide production from ammonia and low molecular aliphatic hydrocarbons.

Solid catalyst particles for use in the present method and apparatus may be formed of natural clays, oxides or the like, or they may be of a synthetic type and of compositions known to the art for the various reactions, and they may for example be of the synthetic type having silica composited with minor proportions of alumina, magnesia, zirconia, or alumina-zirconia and the like. The size of the solid catalyst particles is such that they may be readily fluidized and transported from one zone to another and are preferably substantially spherical in nature so that they flow readily with little or no clogging, and have a minimum tendency of undergoing attrition. For example, spherically formed particles may have a size of the order of from 50 microns to 2 mm. average diameter, and preferably less than about 0.5 mm.

The unitary, compactly arranged apparatus of the present invention, providing for the continuous contacting of the subdivided solid particles with different fluid reactant mediums in adjacent contacting zones, comprises in combination, a confined vertically disposed outer chamber, a small confined inner chamber positioned entirely within and preferably concentrically within the outer chamber, a partitioning wall spaced between the chambers and forming thereby an outer annular particle contacting section and an intermediate annular contacting section, the partitioning wall connecting with the lower end of the outer chamber and being spaced from the upper end of the latter in a manner having the annular shaped contacting sections in communication with one another in the upper portion of the outer chamber, while the inner chamber is sealed by an upper head from the outer chamber and is in open communication at its lower end with the lower portion of the intermediate annular contacting section, fluid outlet means from the upper portion of the outer chamber, an axially positioned inlet conduit having fluid inlet means at its lower end portion and extending upwardly through the bottom portions of the outer chamber and the partitioning wall and through a major portion of the height of the inner chamber, separate fluid inlet and distributing means connecting with the interior lower portion of each of the annular contacting sections, a fluid withdrawal duct extending from the lower portion of the inner chamber to the outside of the outer chamber, and means for passing particles from the lower end of the outer chamber to the inlet end portion of the axially positioned inlet conduit.

In a preferred embodiment or construction, the chambers and the intermediate partitioning wall spaced therebetween are of a cylindrical shape and are concentric with one another, and an annular fluid outlet duct extending downwardly from the lower portion of the inner chamber, and fluid inlet means for the supply of sealing fluid may be provided which are concentric with and of annular shape with respect to the inner axially positioned inlet or transfer conduit. Moreover, an annular shaped particle withdrawal conduit of restricted cross-sectional area for the transfer of particles from the inner chamber to the lower end portion of the intermediate annular contacting section may be formed by a wall member depending from the lower end of the inner chamber to near the bottom portion of the partitioning wall and laterally spaced around the axially positioned inlet conduit and the aforesaid fluid outlet duct and sealing fluid inlet means, respectively.

The size of the chambers and the spacing of the various contacting sections, are regulated to provide desired cross-sectional areas and volumetric capacities within each of the contacting zones, while inter-connecting conduits or passageways are likewise proportioned to provide desired flow rates in effecting the transfer of particles from one zone to another and the supply of fluid streams to the several zones. A preferred apparatus arrangement also uses, in combination with the chambers, suitable conduits and heat exchange means which provides for the transfer of fluid such as hot combustion gases from the upper portion of the outer chamber to at least the fluid inlet and distributing means connecting with the internal lower portion of the intermediate annular contacting section, or to both of the fluid inlet and distributing means connecting with the lower portion of the intermediate and external annular contacting sections, while at the same time providing for indirect heat exchange between a stream of the fluid from the upper portion of the outer chamber with at least a portion of a fluid being supplied from an outside source to the intermediate and outer annular contacting sections. Thus, means are provided for controlling the oxygen content as well as the temperature of each of the streams which are to be introduced, respectively, into the intermediate and external annular-shaped contacting sections, where the latter are used as regenerating zones in effecting the burning and removal of carbonaceous deposits from subdivided solid catalyst or other heat carrying mediums.

Additional operating and construction features of the present invention will be more apparent upon reference to the accompanying drawing and the following description thereof. The drawing illustrates merely one embodiment of the invention in diagrammatic form, and is not to be considered limiting.

For purposes of simplifying the following description, the apparatus and the processing flow will be described with reference to a hydrocarbon oil cracking process, utilizing a suitable cracking catalyst for effecting the continuous catalytic cracking of a gas-oil stream into more desirable and more valuable products.

Referring now specifically to the drawing, there is shown a vertically disposed and confined outer chamber 1, having a removable upper head 2 and a lower removable flange member 3. Concentrically within the outer chamber is an inner chamber 4 and an intermediately positioned partitioning member or wall 5, which in turn forms an outer annular particle contacting zone 6 and an intermediate contacting zone 7. The partitioning wall 5 connects with the lower end of the chamber 1, or as indicated the lower flange member 3, so that the inner annular zone 7 is sealed from the outer annular zone 6 at their lower ends. While the partition 5 is spaced from the inner chamber 4, it is preferably conformed with the general shape of the lower portion of inner chamber 4 such that the outer annular contacting zone 7 extends for substantially the full height of the intermediately positioned partitioning wall 5 and for substantially the full height of the inner chamber 4. The lower end of the inner chamber 4 is restricted in diameter, but is open to and communicates with the lower end portion of the annular contacting section 7 so that particle flow may be continuous from the lower end of the inner chamber 4 into the lower end of the intermediate annular shaped contacting section 7.

In the present embodiment, the hydrocarbon charge stream is passed by way of line 8 and valve 9 into the lower portion of the riser conduit or transfer line 10, which extends axially upwardly through the outer chamber 1 and the inner chamber 4 to substantially the upper portion thereof. In the processing operation, hot subdivided catalyst particles are withdrawn from the lower portion of the outer annular contacting zone 6 by way of outlet leg or conduit 11 and control valve 12, and the hot particles are commingled with the fluid reactant charge stream entering the lower portion of riser conduit 10 such that a fluidized mixture of hydrocarbon vapor and catalyst passes continuously upwardly as a dispersed phase to the upper portion of the inner contacting chamber 4.

The upper portion of the inner chamber 4 is closed so that the vapor and catalyst particles reverse their flow and pass downwardly through the longitudinal portion of the inner reaction zone. The particles settle on to the upper portion of the relatively dense phase or compact bed of particles 13 and the vapors pass downwardly concurrently with the particles to the lower portion of the inner reaction zone 4. Actually, the hydrocarbon charge stream undergoes an initial reaction during the contact with the hot catalyst particles in passing upwardly in a fluidized phase through the transfer conduit 10, whereby the cracking may be initiated or performed to a substantial extent. However, a substantial proportion of the cracking reaction and the completion of this reaction to the desired extent are obtained as the vapors pass downwardly concurrently with the particles in the relatively compact bed 13 and to the product stream withdrawal outlet 14. The present vapor outlet means 14 is provided by an annular perforated plate 15 which in turn is shielded by a suitable umbrella-like or conical plate 16, indicated as attaching to the vertical conduit 10. Thus, the withdrawal zone 14 provides means for obtaining a product vapor stream substantially free of solid particles, and means connecting directly with the inlet or upper portion of a fluid outlet conduit 17. Conduit 17 is placed concentrically around the riser line 10 and provides an annular withdrawal passageway extending downwardly along and around the conduit 10 to a point below the outer chamber 1, in order to connect with a suitable outlet conduit 18 having control valve 19. This product withdrawal means provides an annular shaped passageway which is in heat exchange relationship with the inlet mixed phase stream of fresh hydrocarbon charge and hot catalyst particles being carried upwardly through the riser line 10. This concentric conduit also provides for structurally passing conduit members into the interior of inner reaction chamber 4 without the necessity of expansion joints, or the like, inasmuch as each of the vertical conduits may be suitably connected to and supported from the lower end of the outer chamber 1, or in this instance the lower flange member 3.

The contacted catalyst particles within the lower portion of bed 13 and the lower end of inner reaction chamber 4, continuously pass in a descending gravity flow through the lower end of the chamber, and in this case through the narrow somewhat restricted annular passageway 20 as provided by the smaller diameter depending wall member or section 21 connecting with the lower larger side wall portion of the inner chamber 4. The restricted cross-sectional area of zone 20 provides a desirable sealing and stripping zone into which a suitable stripping and sealing medium may be passed circumferentially to prevent the passage of hydrocarbon vapors with the contacted catalyst particles and at the same time substantially remove all adsorbed or occluded hydrocarbon vapors which may pass with the particles. A stripping and sealing medium, such as high temperature steam, is continuously introduced into the sealing and stripping zone 20 by means of a plurality of nozzles 22, or through a suitable continuous gas distributing ring having a nozzle like action. The stripping and sealing medium is supplied by a vertical conduit 23 concentrically positioned around the withdrawal conduit 17 and the inner axially positioned riser conduit 10. The stream of stripping and sealing medium passing to conduit 23 is in turn supplied to the lower end thereof by means of a supply line 24 having control valve 25, and is discharged through the nozzles 22 at an elevation intermediate the upper and lower ends of the zone 20 so that it passes both upwardly and downwardly from the nozzles through the annular column of catalyst particles descending through the zone 20.

The flow of the stripped contacted catalyst particle stream issuing from the lower end of the neck 21 is reversed and the particles are subsequently passed in a continuous ascending fluidized stream through the intermediate annular shaped contacting zone 7. A gas distributing header 26 is provided within the lower portion of the annular zone 7, so that an oxidizing gas stream being distributed through suitable nozzle means 27 effects the fluidization of the particles and a relatively dispersed phase fluidized transfer to and above the upper end of partitioning member 5 and into a common zone above annular contacting zones 6 and 7.

In accordance with a preferred hydrocarbon cracking operation, two stages of regeneration are obtained in the present process, with the first stage oxidizing gas which is introduced by way of header 26 having a reduced oxygen content, so that there is incomplete burning of the carbonaceous deposit on the particles. The oxidizing gas stream from header 26 is supplied by way of an annular passageway around the aforementioned concentric conduits 17 and 23, and as provided by the lower portion 28 of partition member 5 and the concentric conduit member 29 which has the inlet conduit 30 connecting thereto. An air stream mixed with flue gas or other relatively inert medium may be introduced through the line 30 and valve 30', as will hereinafter be discussed more fully, to provide a low oxygen content stream for the first stage of regeneration within the rising fluidized bed or dispersed phase in annular zone 7.

The partially regenerated particles issuing from this first oxidizing and regenerating stage of zone 7, are caused to drop downwardly and outwardly into the outer or external space 6, lying between the partitioning member 5 and the wall of chamber 1, and settle to form a relatively dense descending fluidized or compact moving bed 31. The particles in the outer bed 31 may be maintained in a fluidized state by means of a second stage oxidizing and regenerating gas stream which is introduced into the lower portion thereof by means of distributing header 32. In any event, there is countercurrent contacting of the particles in this outer zone and substantially complete oxidation and removal of all carbonaecous contaminating matter on the catalyst particles prior to their being withdrawn by way of the outlet withdrawal conduit 11. Resulting flue gases from both the intermediate ascending fluidized bed of zone 7 and the outer descending bed 31 in zone 6, commingle within the upper portion of the outer chamber 1 and are withdrawn by way of particle separator 33 and outlet line 34 having control valve 35.

Stripping of the regenerated particles passing downwardly through the outer zone 6 to the withdrawal leg 11 may be accomplished by means of steam or other sealing and stripping fluid introduced into the lower end portion of the annular zone 6 by way of line 36, valve 37 and distributing header 38, as well as by means of a stripping fluid inlet line 39 having valve 40, which communicates with the lower portion of the withdrawal conduit 11.

In accordance with the present embodiment of the invention, the second stage of catalyst regeneration is effected with a gaseous stream of higher oxygen content than that utilized in the first stage, and may comprise a controlled temperature air stream having an oxygen content of about 20%. It may also be pointed out, that while the first stage of regeneration is effected in a relatively disperse concurrent rising stream of mixed catalyst and regenerating gaseous medium in zone 7, the countercurrent operation within the external zone 6 permits the oxygen stream to contact the particles in a manner having the portion of the stream of highest oxygen content come in contact with the particles having had substantially all of the carbonaceous deposits burned and removed therefrom, whereby excessive burning and high temperature conditions are substantially precluded.

In a valuable and desirable combination, heat exchange means is provided with the present contacting apparatus, hot flue gases passing from line 34 to a heat exchanger 41, whereby air or gaseous oxygen-containing regenerating medium may be preheated by indirect heat exchange with the hot flue gas stream. Cooled combustion gases are discharged from the heat exchanger 41 by way of line 42 and valve 43; line 44 and valve 45 provide means for by-passing the excess hot combustion gases from line 34, thus avoiding the necessity of passing the entire flue gas stream through the heat exchanger 41. Also, withdrawal line 46 and valve 47 connecting with pump or blower 48, provides means for passing a portion of the hot flue gas stream by way of line 49 and valve 50 to the regenerating medium supply line 30, which in turn communicates with the inlet conduit 29 and distributing header 27 supplying the first stage regeneration gas. Thus, there is provided means for admixing a portion of the hot flue gas stream directly with the incoming air or oxygen-containing stream to dilute and heat the latter and provide a desired oxygen content regenerating medium for the first stage of reactivation in zone 7.

The fresh air or oxygen-containing stream for regeneration in both zones is supplied by way of line 51 having valve 52 and blower 53 which in turn discharges through line 54 having control valve 55. Line 54 connects with the heat exchanger 41 and passes the air stream in heat exchange relationship with the hot flue gas stream therein whereby a heated air stream is discharged by way of distributing line 56 and valve 57, with line 56 connecting with the distributor header 32 in the lower portion of the outer contacting zone 6. Also, auxiliary lines interconnect between outlet line 56 and supply line 30 so that any desired mixture of unheated and heated air may be supplied to each of the regenerating zones. In other words, line 30 connects directly with line 54 whereby unheated air stream may be introduced into the first stage regeneration zone by way of annular conduit passageway 29 and distributing header 27 and interconnecting line 58 with valve 59 provides means for passing unheated air from line 30 to line 56 for distribution in the header 32 for the external zone 6. Alternatively, line 60 with valve 61 provides means for interconnecting conduits 56 and 30 to supply heated air to the latter conduit for introduction to the initial regeneration zone 7.

It is a particular feature of the present invention to maintain indirect heat exchange between the upflowing column of particles in the intermediate annular-shaped zone 7 and the downflowing bed within the reaction chamber 4, and screen the material and the temperature within the inner reaction zone from that within the outer high temperature regeneration zone 6 wherein the final combustion and oxidation of carbonaceous deposit is effected in a countercurrent operation. The temperature in the concurrent up flow first stage regeneration zone is controlled by the temperature and oxygen content of the gas supplied to the lower end of the annular zone 7 by way of distributing nozzles 27, and this gas preferably is a mixture having a lower oxygen content than air and in turn is provided by commingling relatively cool air with hot combustion gases recirculated from the system. In the present embodiment, the temperature of this gas mixture may be adjusted readily by blending cold air in conduit 30 with preheated air from conduit 60, while as stated the oxygen content may be controlled by blending hot combustion gases from line 34 and line 49 with the temperature controlled air stream entering line 30, so that the final mixture of both controlled oxygen content and controlled temperature is introduced into the conduit 29 and distributing header 26. Preferably the combustion of carbonaceous deposits from the catalyst particles in the first zone of regeneration is controlled to maintain it at about the same or only a moderately higher temperature than that maintained in the conversion chamber 4.

The regenerating gas supplied to the outer annular burning zone 6, as noted hereinbefore, may advantageously be air with an oxygen content of about 20%, however, its temperature may be controlled readily by blending cold and preheated air so as to obtain in this outer countercurrent flow zone, a substantially complete burning with dissipation of combustion heat by its absorption by the incoming relatively cool oxidizing gas stream. At the same time, the temperature in the outer burning zone is maintained at a sufficiently higher level than that of the reaction temperature in the riser conduit 10 and within the inner reaction chamber 4, so that the particle stream recirculated from the outer chamber to the vertical transfer conduit will impart to the incoming stream sufficient heat to maintain a dispersed suspension or fluidized mixture at a temperature which is equal to, or slightly higher, than the average reaction temperature within the descend- the bed of material 13 within the reaction chamber 4. The controlled temperature air stream issuing from the distributing header 32 in the lower portion of the final regeneration zones, is obtained by blending air from line 30 and line 58 with that passing from the heat exchanger 41, by way of line 56.

It may also be pointed out that a particularly advantageous feature of the present operation resides in the considerable flexibility of the processing operation. The upper level of the descending bed 13 within the reaction chamber 4 may be adjusted and varied between the top of the riser conduit 10 and the product stream withdrawal header 14. Also, the level of the descending bed of material 31 in the outer annular zone 6 may be adjustably controlled to maintain a level anywhere from the top of the partitioning member 5 down to the top of the fluid distributing member 32, but preferably the upper level of the bed in the outer zone is maintained somewhat above the widened lower zone so that there is fluidization and relatively uniform contacting of all particles by the second stage oxidizing medium.

The processing operation and the apparatus of this invention, may be carried out at any desired subatmospheric, atmospheric or superatmospheric temperature, however, the pressure within the top portion of the reaction chamber 4 is preferably maintained at least equal to or preferably slightly higher than the pressure in the combustion gas collecting space within the outer chamber 1. In the sealing and stripping zone 20, at the lower end of chamber 4, a suitable sealing fluid such as for example steam, is introduced by way of a nozzle 22 at a higher pressure than the fluid pressure prevailing in the particle mass descending through the stripping and sealing zone, in order to secure both up flow and down flow of the sealing fluid through the descending mass of subdivided catalyst particles.

As noted hereinbefore, the cross-sectional area of each of the separate contacting zones may be varied to meet desired conversion conditions, however, more commonly in the conversion of a hydrocarbon stream such as in the present catalytic cracking process, the inner reaction zone has a free cross-sectional area which is substantially larger than that of the intermediate annular shaped zone 7, and somewhat smaller than that of the outer oxidizing zone 6. Also, the density of the dispersed phase mixture in the vertical riser 10 is maintained at a lower value than the density of the fluidized mass in the intermediate annular concurrent stream of zone 7, although the latter density is of course substantially less than that maintained within the descending bed of the inner reaction zone and the outer annular countercurrent compact moving or dense fluidized bed 31 of zone 6.

It is a particular construction feature of the present apparatus to have all internal members supported from the outer chamber in order that there be no necessity for expansion joints to accommodate the differential expansions of chambers or partitioning members providing the separate contacting zones. As indicated, the partitioning member 5 may be supported from the lower end of the outer chamber 1, or from the lower removable flange 3, and the inner chamber 4 suspended from the upper end of the chamber 1 by suitable rods or hanger members 62, while the internal vertical concentric conduits 10, 17, 23, and 29 are also supported from the lower end of the chamber 1, either directly or indirectly, each of these conduits preferably being supported from a single level in a manner permitting them to expand with temperature changes, and without the use of expansion joints.

I claim as my invention:

1. A hydrocarbon conversion process which comprises maintaining a relatively compact, descending bed of subdivided solid particles at conversion temperature in a reaction zone, introducing to the upper portion of said zone above said bed a suspension of subdivided solid particles in a fluid hydrocarbon reactant, depositing the last-named particles onto the top of said bed and passing the hydrocarbon reactant downwardly through the bed, withdrawing solid particles in a downward direction from the lower portion of the reaction zone and suspending the same in a stream of oxygen-containing regenerating gas, passing the resultant suspension upwardly in the form of an annular column surrounding and in heat exchange relation with said bed in the reaction zone and burning carbonaceous contaminants from the particles during their ascent in the annular column, gravitating the particles discharging from said column onto the top of an annular descending column of subdivided particles surrounding and in heat exchange relation with said upwardly moving annular column, passing a second stream of oxygen-containing regenerating gas upwardly through said descending annular column and therein burning additional carbonaceous contaminants from the solid particles, removing regenerated particles downwardly from the lower portion of said descending annular column and suspending the same in a stream of the fluid hydrocarbon reactant, and passing the resultant suspension upwardly in a confined path extending through said compact descending bed into the upper portion of said reaction zone above the compact bed.

2. The method of claim 1 further characterized in that a fluid product stream separated from the descending bed in said reaction zone is discharged therefrom through an annular path extending downwardly around an initial portion of said confined path, said particles being withdrawn from the lower portion of said reaction zone and passed in an annular restricted descending column circumscribing said annular path, and a stripping and sealing medium is passed circumferentially into said annular restricted column of particles at an intermediate elevation of the height thereof.

3. A hydrocarbon conversion process which comprises maintaining a relatively compact, descending bed of subdivided solid particles at conversion temperature in a reaction zone, introducing to the upper portion of said zone above said bed a suspension of subdivided solid particles in a fluid hydrocarbon reactant, depositing the last-named particles onto the top of said bed and passing the hydrocarbon reactant downwardly through the bed, withdrawing solid particles in a downward direction from the lower portion of the reaction zone and suspending the same in a stream of oxygen-containing regenerating gas, passing the resultant suspension upwardly in the form of an annular column surrounding and in heat exchange relation with said bed in the reaction zone and burning carbonaceous contaminants from the particles during their ascent in the annular column, gravitating the particles discharging from said column onto the top of an annular descending column of subdivided particles surrounding and in heat exchange relation with said upwardly moving annular column, passing a second stream of oxygen-containing regenerating gas upwardly through said descending annular column and therein burning additional carbonaceous contaminants from the solid particles, removing regenerated particles downwardly from the lower portion of said descending annular column and suspending the same in a stream of the fluid hydrocarbon reactant, and passing the resultant suspension upwardly to the upper portion of said reaction zone above the bed of particles therein.

4. A method for contacting subdivided solid catalyst particles with at least one reactant stream and two reactivating streams, which comprises, commingling a fluid hydrocarbonaceous reactant stream with hot subdivided catalyst particles and passing the commingled materials as a dispersed suspension in a confined path upwardly through a major portion of a confined reaction zone and into the upper portion thereof, reversing the direction of flow of the resulting gasiform hydrocarbonaceous fluid and catalyst particles within the upper portion of said reaction zone and permitting the catalyst particles to settle onto the upper portion of a descending compact bed of particles therein, passing said gasiform fluid at conversion conditions concurrently downwardly with the descending bed of particles to the lower portion of said reaction zone and separating the resulting gasiform conversion products from the contaminated catalyst particles in the lower portion of said bed, withdrawing the gasiform product stream from the lower portion of said reaction zone through a continuous annular path extending concentrically around the lower portion of said confined path, continuously withdrawing the contaminated particles in an annular descending column circumscribing said continuous annular withdrawal path, introducing a sealing and stripping medium into said descending column of particles at an intermediate elevation in the height thereof and at a velocity and pressure providing both concurrent and countercurrent flow of the stripping medium with respect to the flow of particles descending from the lower portion of said reaction zone, commingling a low oxygen content regenerating gas with said contaminated catalyst particles issuing from said annular descending column and reversing the flow thereof, passing the mixture of said regenerating gas and contaminated particles as a fluidized dense phase upwardly at oxidizing temperature through an inner regenerating zone confined annularly in between said reaction zone and an external annular regenerating zone, passing the thus partially regenerated and upwardly transported catalyst particles from the top portion of said inner regenerating zone into the upper portion of said external annular regenerating zone and downwardly therethrough as a dense annular mass at oxidation temperature in countercurrent contact with a second regenerating gas of substantially higher oxygen content than that introduced into said innner regenerating zone, commingling and discharging resulting hot combustion gases from the upper portions of both the inner and external annular regenerating zones, continuously discharging resulting reactivated and heated catalyst particles from the lower portion of said external annular regenerating zone and commingling them as said hot catalyst particles with said fluid hydrocarbonaceous reactant stream.

5. The method of claim 4 further characterized in that a stream of said hot combustion gases being discharged from said regenerating zones in passed in indirect heat exchange relationship with at least a portion of the oxygen-containing regenerating gas being introduced into the lower portion of each of the inner and external annular regenerating zones whereby to preheat said regenerating gas, and another stream of said hot combustion gases is commingled with preheated regenerating gas being introduced into said inner regenerating zone.

6. The process of claim 3 further characterized in that said particles comprise a cracking catalyst and said reactant comprises hydrocarbons heavier than gasoline which are cracked during their downward passage through said bed in the reaction zone.

7. The process of claim 3 further characterized in that said second stream of regenerating gas is of higher oxygen content than the first-mentioned regenerating gas stream.

8. A catalytic conversion process which comprises commingling a fluid hydrocarbonaceous reactant stream with hot subdivided catalyst particles and passing the commingled materials in a confined path upwardly through a major portion of a confined reaction zone and into the upper portion thereof, reversing the flow of the resulting hydrocarbonaceous fluid and catalyst particles within the upper portion of said reaction zone and passing them concurrently downwardly in a relatively compact descending bed to the lower portion of said reaction zone while subjecting said hydrocarbonaceous fluid to endothermic conversion in said bed and maintaining said bed in indirect heat exchange relation with said commingled materials in said confined path, separating resulting gasiform conversion products from the lower portion of said descending bed and withdrawing them from said reaction zone, continuously withdrawing contaminated catalyst particles in a descending column from the lower portion of said reaction zone, reversing the flow of the withdrawn contaminated particles and fluidizing them in a regenerating gas of lower oxygen content than that required for complete combustion of the combustible deposit on said contaminated particles, passing the fluidized contaminated particles at oxidizing temperature concurrently with said regenerating gas as an ascending fluidized dense phase through a confined inner regenerating zone annularly surrounding said reaction zone and annularly surrounded by an external regenerating zone, maintaining said ascending fluidized phase in indirect heat exchange relation with said compact descending bed, passing resultant partially regenerated catalyst particles from the top portion of said inner regenerating zone into the upper portion of said external regenerating zone and downwardly therethrough as a dense annular mass at an oxidation temperature above the temperature prevailing in said reaction zone and in countercurrent contact with a second regenerating gas of sufficient oxygen content to substantially free the catalyst particles from combustible contaminants, commingling and discharging resulting combustion gases from the upper portions of both the inner and external annular regenerating zones, continuously discharging reactivated and heated catalyst particles from the lower portion of said external annular regenerating zone and commingling them as said hot catalyst particles with said fluid hydrocarbonaceous reactant stream.

9. A unitary apparatus for effecting the continuous contacting of subdivided solid particles with several fluids which comprises, in combination, a confined vertically disposed outer chamber, a smaller confined inner chamber positioned entirely within said outer chamber and being sealed at its upper end and open at its lower end, an axially positioned inlet conduit having fluid inlet means at its lower end portion and extending upwardly through the lower end of said outer chamber and through a major portion of the height of said inner chamber with the open lower end of the latter being circumferentially spaced from said inlet conduit, a partitioning wall substantially concentrically spaced between said outer and inner chambers, said partitioning wall being circumferentially sealed at its lower end to said inlet conduit at an elevation below the open lower end of said inner chamber and extending upwardly through the major portion of the height of said outer chamber to an elevation below the upper end of the latter and thereby dividing the space between said chambers into an intermediate annular particle contacting section in open communication at its lower end with the lower end of said inner chamber and into an outer annular particle contacting section sealed at its lower end from said intermediate annular section and in open communication at its upper end with the latter and with the upper portion of said outer chamber, separate fluid inlet and distributing means connecting with the interior lower portions of each of said annular contacting sections, a fluid withdrawal duct extending from the lower portion of said inner chamber to the outside of said outer chamber, and means for passing particles from the lower end of said outer chamber to the inlet end portion of said axial inlet conduit.

References Cited in the file of this patent

UNITED STATES PATENTS

| Number | Name | Date |
|---|---|---|
| 2,427,341 | Alther | Sept. 16, 1947 |
| 2,440,475 | Jacomini | Apr. 27, 1948 |
| 2,448,334 | Watson | Aug. 31, 1948 |
| 2,464,257 | Pelzer et al. | Mar. 15, 1949 |
| 2,464,812 | Johnson | Mar. 22, 1949 |
| 2,525,925 | Marshall | Oct. 17, 1950 |